United States Patent [19]

Givens

[11] 4,180,731
[45] Dec. 25, 1979

[54] RADIOACTIVE LOGGING SONDE INCLUDING MEANS FOR MONITORING NEUTRON SOURCE OUTPUT

[75] Inventor: Wyatt W. Givens, Dallas, Tex.

[73] Assignee: Mobil Oil Corporation, New York, N.Y.

[21] Appl. No.: 871,266

[22] Filed: Jan. 23, 1978

[51] Int. Cl.² .............................................. G01V 5/00
[52] U.S. Cl. ................................... 250/270; 250/252
[58] Field of Search ............... 250/269, 270, 252, 499, 250/500, 501, 502

[56] References Cited

U.S. PATENT DOCUMENTS 3,710,112  1/1973  Caldwell et al. ................. 250/270 X Primary Examiner—Davis L. Willis
Attorney, Agent, or Firm—C. A. Huggett; William D. Jackson; William J. Scherback

[57] ABSTRACT

A radioactivity borehole logging sonde includes a pulsed neutron source and a gamma-ray detector. A cylinder of a material susceptible to neutron activation is positioned about the neutron source before or after a radioactivity logging operation. The neutron source is turned ON to activate the material of the surrounding cylinder. After activation, the neutron source is turned OFF and the cylinder is moved to a position about the gamma-ray detector. The gamma-ray detector monitors the radiation from the activated cylinder as a measure of the output from the neutron source.

8 Claims, 1 Drawing Figure

RADIOACTIVE LOGGING SONDE INCLUDING MEANS FOR MONITORING NEUTRON SOURCE OUTPUT

BACKGROUND OF THE INVENTION

This invention relates to radioactive well logging and more particularly to pulsed neutron logging.

Perhaps the most widely used of the radioactive logging procedures are the neutron logging techniques in which a formation under investigation is irradiated with neutrons and the resulting secondary radiation measured in order to characterize the formation. The neutron irradiation may be by means of a continuous source or a pulsed source, and the secondary radiation detected typically will take the form of thermal or epithermal neutrons or gamma rays such as may result from inelastic scattering reactions or neutron capture. In pulsed neutron logging, the formation is bombarded with repetitive time-spaced bursts of fast neutrons, and the resulting secondary radiation is measured at selected time intervals, normally by gating the output of the detector, in order to arrive at a decay parameter.

The neutron sources employed in radioactive well logging normally are of the accelerator type employing the deuterium-tritium reaction to produce neutrons or of the chemical type such as those employing the action of alpha particles from an emitter material such as polonium on a neutron emitter material such as beryllium. The accelerator type neutron sources have a high-energy, high-intensity monoenergetic neutron output which varies widely and unpredictably in intensity. Hence, it is desirable to monitor the output to know that a constant output is produced during each assaying period or to correct or compensate for variations in the neutron output. The response time of a conventional fast neutron detector is not fast enough to detect directly and measure accurately the number of neutrons produced by the source when it is being operated to produce neutron bursts having a time duration of a few microseconds or less.

SUMMARY OF THE INVENTION

In accordance with the present invention, the output of a radioactivity borehole logging tool is monitored before and after a logging operation. A material susceptible to neutron activation is positioned about the neutron source. The neutron source is turned ON for a period of time to activate the material to a sufficient threshold level. The material is then moved to a position about a gamma-ray detector which monitors the radiation from the neutron-activated material as a measure of the output of the neutron source. In response to changes in the output of the gamma-ray detector, the power supplied to the neutron source may be adjusted so as to maintain a desired output from the neutron source.

Preferably, such material has a radioactive half life in the order of several minutes. In such case, the neutron source is turned On for several minutes during the activation of the material, and thereafter the gamma-ray detector monitors the radiation from the activated material for several minutes.

DESCRIPTION OF THE PREFERRED EMBODIMENT

Figure 1:
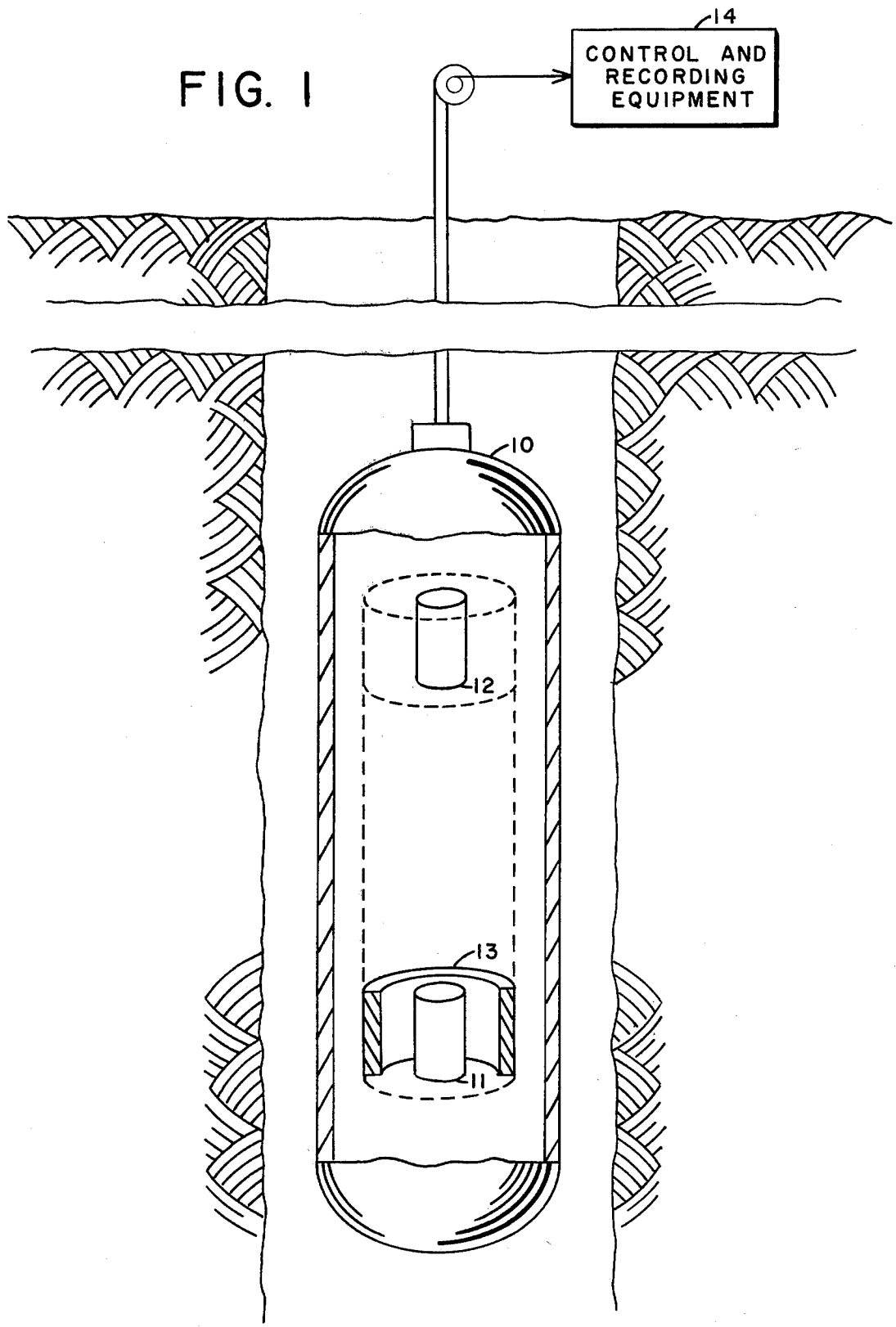
FIG. 1 illustrates a downhole radioactive logging sonde including means for monitoring the output of the neutron source.

Referring now to FIG. 1, there is illustrated a downhole logging sonde 10 employed for carrying out the method of the present invention. The sonde 10 includes the neutron source 11 and the axially spaced gamma-ray detector 12. Electrical signals from uphole control and recording equipment 14 function to control the application of high voltage to the neutron source so as to carry out conventional pulsed neutron borehole logging operations.

Illustrated as being positioned about the neutron source 11 is a cylinder 13 comprising a material that is susceptible to neutron activation, preferably fluorine, $^{19}F$, for example. Upon application of high voltage to the neutron source 11, neutrons from the source irradiate the fluorine in the cylinder 13. For neutron energy in excess of 10.414 MEV, $^{18}F$ is produced in the reaction $^{19}F(n,2n)^{18}F$ and has a half life of about 109.8 minutes. $^{18}F$ decays by ways of electron capture and produces gamma radiation of 511 KEV. Another material susceptible to neutron activation and suitable for use in the cylinder 13 under certain circumstances is aluminum, $^{27}Al$. When irradiated with neutrons from an energy source in excess of 1.85 MEV, magnesium $^{27}Mg$ is produced in the reaction $^{27}Al(n,p)^{27}Mg$ and has a half life of about 9.46 minutes.

Preferably, the neutron source is operated to irradiate the cylinder 13 for several minutes. Thereafter, the neutron source is turned OFF and the neutron-activated cylinder 13 is moved axially to a second position about the gamma-ray detector 12. The means for moving such cylinder may be any of several conventional means for moving items from one position to another axially within a logging sonde, such as the motorcontrolled ratchet of U.S. Pat. No. 3,688,114; the magnetically operated core of U.S. Pat. No. 3,388,253; or the solenoidactuated spring of U.S. Pat. Nos. 3,800,145 and 3,688,114.

Upon being moved to such second position about the gamma-ray detector 12, gamma rays from the neutron-activated fluorine irradiate the gamma-ray detector 12 for a period of several minutes preferably. During this time, the gamma rays striking the gamma-ray detector are monitored and sent to the control and recording equipment. The recorded gamma-ray count is a measure of the output from the neutron source 12, which output will decrease over a period of time. By observing the recorded gamma-ray count, such decrease in neutron source output can be detected and adjusted, both before and after a logging run, to the desired output level by control of the high voltage supplied to the neutron source. Such gamma-ray count can also be used to correct delayed fission neutron counts for changes in the neutron source output occurring during the course of a series of assay operations. In order to use the neutron source output measurements taken before and after logging runs to correct for changes in the neutron source output during a series of assay operation, the short-term neutron output (i.e., taken during the period required to assay a typical borehole, 60–90 minutes, for example) versus the operation time characteristic of the particular neutron source being utilized must be known.

It is to be understood that the foregoing disclosure relates to only a preferred embodiment of the invention and that various modifications may be resorted to by those skilled in the art without departing from the spirit and scope of the invention as hereinafter defined by the appended claims.

I claim:

1. A method of monitoring the output of a radioactivity borehole logging tool having a pulsed neutron source and a gamma-ray detector, comprising the steps of:
   (a) positioning a material susceptible to neutron activation about the neutron source,
   (b) operating said neutron source during a time period sufficient to activate said material,
   (c) moving said material to a position about the gamma-ray detector, and
   (d) monitoring the output of said gamma-ray detector as it is irradiated with gamma rays from said material as a measure of the output of said neutron source.

2. The method of claim 1 wherein said neutron source is operated for a period of several minutes during the activation of said material.

3. The method of claim 1 wherein the output of said neutron source is at least 10 MEV.

4. The method of claim 1 wherein the half life of said neutron-activated material is in the order of several minutes.

5. The method of claim 4 wherein said material comprises fluorine.

6. The method of claim 1 further including the step of adjusting the power supplied to said neutron source in response to changes in the output of said gamma-ray detector so as to maintain a desired output from said neutron source.

7. A system for monitoring the output of a neutron source in a radioactivity borehole logging tool, comprising:
   (a) a neutron source,
   (b) a gamma-ray detector axially spaced from said neutron source,
   (c) a material susceptible to neutron activation,
   (d) means for positioning said material in a first position near said neutron source, whereby said material is activated in response to irradiation of neutrons from said neutron source, and
   (e) means for positioning said material in a second position near said gamma-ray detector, whereby said detector monitors gamma rays from said neutronactivated material as a measure of the output from said neutron source.

8. The system of claim 7 wherein said material is in the form of a cylinder so as to surround said neutron source in said first position and to surround said gamma-ray detector in said second position.

* * * * *